Patented Sept. 18, 1923.

1,468,607

UNITED STATES PATENT OFFICE.

HANS STENZL, OF NIEDER-INGELHEIM-ON-THE-RHINE, GERMANY, ASSIGNOR TO THE FIRM OF C. H. BOEHRINGER SOHN CHEMISCHE FABRIK, OF NIEDER-INGELHEIM-ON-THE-RHINE, GERMANY, A SOCIETY OF GERMANY.

PROCESS FOR PRODUCING PAPAVERINE NITRITE.

No Drawing.  Application filed August 9, 1922. Serial No. 580,764.

*To all whom it may concern:*

Be it known that I, HANS STENZL, a citizen of the German Republic, and resident of Nieder-Ingelheim-on-the-Rhine, Germany, have invented certain new and useful Improvements in a Process for Producing Papaverine Nitrite, of which the following is a specification.

The invention is based on the observation that the mutual reaction of salts of papaverine and nitrous salts furnishes a mixture of very difficultly soluble papaverine nitrite and papaverine, from which, by the aid of suitable solvents for papaverine, the papaverine nitrite can easily be recovered in a pure state.

The process may be carried out, for example, by decomposing any soluble salt of papaverine—such as papaverine sulphate or papaverine phosphate—with an alkali nitrite, and treating the resulting precipitate with solvents of papaverine, for example, benzol—which is specially suitable for this purpose—alcohol, toluol, tetrahydronaphthalene, or the like.

A particularly advantageous procedure is, for example, to effect the conversion in the presence of a solvent of papaverine, by which means the papaverine liberated by the dissociation, is prevented, at the outset, from separating out. In this case the solid reaction product can be afterwards washed with a solvent of papaverine.

Example 1.

100 grms. of papaverine sulphate are dissolved in 300 c. c. of water and slowly treated with 20 grms. of sodium nitrite in 100 c. c. of water. The oil which separates out solidifies gradually, and is filtered and washed with water. After being dried, it is shaken up repeatedly with benzol, until this latter ceases to take up anything further. 40 grms. of nitrous salt are obtained. The remainder of the papaverine can be recovered from the benzol.

Example 2.

70 grms. of papaverine are dissolved in 100 c. c. of 20% sulphuric acid, 20 c. c. of benzol being then added, followed by the addition, drop by drop, of 15 grms. of sodium nitrite dissolved in 50 grms. of water, the whole being kept stirred. The oil separating out, which sets very quickly, is washed with water and benzol. 60 grms. of nitrite, in an excellent state of purity, are obtained.

Example 3.

50 grms. of papaverine sulphate are dissolved in 100 c. c. of water and 200 c. c. of alcohol, whereupon 10 grms. of sodium nitrite in 50 c. c. of water are added. The oil which separates out, is siphoned off and then washed with water and alcohol.

Papaverine nitrite is an almost colorless sandy powder, which gradually decomposes at about 140° C. It gives the usual reactions for nitrous acid and papaverine. From the therapeutic standpoint, papaverine nitrite possesses the valuable property of affecting the tissue-tension in a remarkable degree.

What I claim and desire to protect by Letters Patent is:—

1. A process for producing papaverine nitrite consisting therein, that papaverine salts are converted by means of salts of nitrous acid and the product of the reaction is treated with solvents of papaverine.

2. A process for producing papaverine nitrite consisting therein, that papaverine salts are converted by means of salts of nitrous acid in the presence of solvents of papaverine.

3. A process for producing papaverine nitrite, consisting therein, that the papaverine salts are converted by means of salts of nitrous acid in the presence of solvents for papaverine and the resulting solid product is treated with solvents of papaverine.

4. A process for producing papaverine nitrite, consisting therein that papaverine sulphate is converted by means of an alkali salt of nitrous acid and the product of the reaction is treated with benzol.

5. A process for producing papaverine nitrite consisting therein that papaverine sulphate is converted by means of an alkali salt of nitrous acid in the presence of benol.

6. A process for producing papaverine nitrite consisting therein, that papaverine sulphate is converted by means of an alkali salt of nitrous acid in the presence of benzol and the resulting solid product is treated with a solvent for papaverine.

7. As a new product, the herein described papaverine-nitrite, being an almost colorless sandy product, gradually decomposing at about 140 centigrades, giving the usual reactions of nitrous acid and papaverine, being practically insoluble in benzol, alcohol, toluol, tetrahydronaphthalene and the like solvents, and exhibiting the property of affecting the tissue-tension in a remarkable degree.

In testimony whereof I have signed my name to this specification in the presence of two subscribing witnesses.

DR. HANS STENZL.

Witnesses:
 GEORG LATTERHOS,
 HANS KRAUS.